No. 724,383. PATENTED MAR. 31, 1903.
R. S. DONALDSON.
JUNCTION BOX.
APPLICATION FILED JUNE 4, 1900.
NO MODEL.
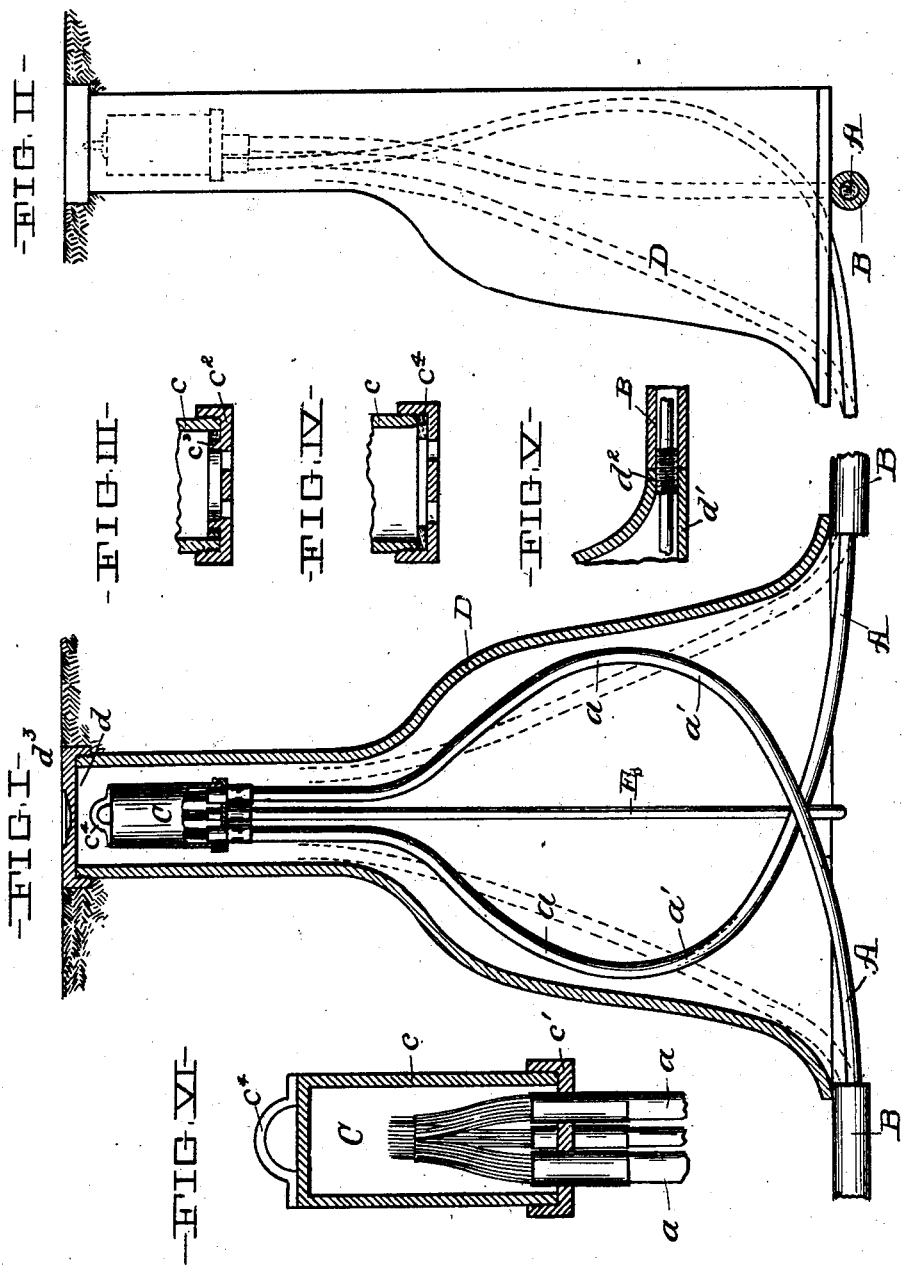
Witnesses,
J. C. Turner
N. E. Merkel
Inventor,
R. S. Donaldson
By J. B. Fay
Atty.

UNITED STATES PATENT OFFICE.

ROBERT S. DONALDSON, OF CLEVELAND, OHIO.

JUNCTION-BOX.

SPECIFICATION forming part of Letters Patent No. 724,383, dated March 31, 1903.

Application filed June 4, 1900. Serial No. 18,936. (No model.)

*To all whom it may concern:*

Be it known that I, ROBERT S. DONALDSON, a citizen of the United States, and a resident of Cleveland, county of Cuyahoga, and State of Ohio, have invented a new and useful Improvement in Cable-Joints for Electrical Distribution, of which the following is a specification, the principle of the invention being herein explained and the best mode in which I have contemplated applying that principle, so as to distinguish it from other inventions.

My invention relates to connections for electrical conductors for electrical distribution; and it consists of means hereinafter fully described.

The annexed drawings and the following description set forth in detail certain mechanism embodying the invention, such disclosed means constituting but one of various mechanical forms in which the principle of the invention may be used.

In said annexed drawings, Figure I represents a vertical longitudinal cross-section of the outer incasing portion of my invention, showing the interior construction and arrangement partly in elevation and partly in vertical section, such construction being particularly adapted for underground-cable distribution. Fig. II represents an end elevation of said invention. Figs. III, IV, and V represent enlarged vertical cross-sections of modifications of details of the device; and Fig. VI represents an enlarged vertical axial cross-section of a terminal receiver used in my invention, showing the cable-terminals in elevation therein.

At the point at which it is desired to distribute the current from the main-line cable A two terminals of such cable are provided. The terminal portions are made of a length sufficient to permit the extremities thereof to be carried some distance aboveground or into proximity with the ground-surface. For this purpose the conduit B may be cut and a section thereof removed, as shown, or suitable apertures may be provided in the upper portion of the conduit-shell. The terminal portions $a\ a$ of the main-line cable extend upwardly in a direction transverse with respect to the main cable portion adjacent thereto, as shown, their extremities passing through the bottom of and being inclosed within a receptacle or cap C. Such extremities are caused by any suitable means to make a hermetical joint with the cap. Said cap is provided with a removable cover $c$, adapted to close and hermetically seal it, so that, as is seen, the cable ends may be hermetically sealed within such cap. Various methods of constructing an air-tight cover for the cap may be employed, such as are illustrated in Figs. I, III, IV, and VI. The construction illustrated in Fig. VI consists of a cupped portion $c'$, into which is placed the cylindrical bell top or cover $c$. After the cover is in place the line of junction of the cover and bottom is soldered. In order to remove the cover subsequently, the solder may be readily removed by the application of heat. Fig. III illustrates a mercury joint, and shows the bottom $c^2$ provided with an interior thread and with an interior wall $c^3$, which confines the mercury in an annular space, into which the cover, provided with an external thread, is screwed, as shown, the mercury filling up the interstices, making an air-tight joint. A third method of producing such joint is illustrated in Fig. IV, in which the lower surface of the cover is beveled and screwed tightly into a lead or other suitable annular gasket $c^4$.

Intermediately of the extremity of each terminal portion and the main cable portion adjacent to such terminal portion is formed a loop $a'$, the two loops being preferably formed in opposite directions and caused to cross, as shown in Fig. I. Such construction renders that portion of the cable between the terminal extremities and their respective main portions of the cable flexible and permits of the extension of such terminal portions in the before-mentioned transverse direction.

A cast-iron casing D is placed in a suitable excavation, so as to inclose the terminal portions $a\ a$ and the inclosing cap C, when the mouth $d$ of the casing is caused to be flush with the surface of the ground. Such casing is provided with downwardly and outwardly flaring walls, Fig. I, to conform with the formation of the loops and permit the latter to repose therein, the upper or neck portion of the casing being made of just sufficient diameter to permit the cap C to be easily moved longitudinally therein. A closed bottom $d'$, Fig. V, may be provided for said casing, or the bottom may be left open. In the latter case the casing is set upon the two adjacent conduit ends and the terminal portions passed up beneath the bottom rim, as shown in Fig. I. The lower inner surfaces of that part of the casing adjacent to the conduit are made of rounded or convex form, as shown. When it is desired to provide a closed casing, suitable apertures $d^2$, Fig. V, are provided for the entrance of the cable, the joint in such case being capable of being made air or water tight. The service-cable E enters the lower portion of the casing in a manner similar to that of the two main-line cables, passes upwardly, and enters the cap C, its extremity being confined therein similarly to those of the two main-line-cable terminals. The terminal portion of such service-cable is provided with the previously-described looped formation, whereby it is rendered flexible and extensible. The casing-wall opposite such loop is given a suitable flaring form, and the lower inner surface adjacent to the lower portion of the loop is given a convex formation, as shown. When a closed-bottom casing is used, the exit of the service-cable is made through a suitable aperture and may be made air and water tight. The casing-mouth is provided with a suitable cover $d^3$, flush with the ground-surface, whereby it may be effectually closed. The top of the cover C is provided with a suitable handle $c^4$.

When it is desired to connect or disconnect wires in the two main-line-cable terminals or to connect or disconnect the wires of said terminals with the service-cable terminal, the cover $d^3$ is removed, the handle $c^4$ grasped, and the cap with the attached terminal cable portions drawn up and out of the casing. The cap's cover may now be removed, the desired connection or changes in connections made, the cover $c$ replaced, and the cap reinserted in the casing. The cover $d^4$ being now replaced, the whole structure is below ground, offering no superficial obstruction at the point at which it is placed. During such operation of drawing the terminals upwardly the loops are caused to straighten, and in so doing may contact the lower portion of the casing. Such contact when it occurs, as shown in dotted lines, Figs. I and II, takes place upon the convex surfaces provided at the points previously described, thereby preventing injury to the cable.

By using the above-described device in a system of electrical distribution where it is desirable to embed the main conductor in material and preserve an unobstructed exterior, such conductor may be provided with as many such above-described joints as there are required service-conductors, one service-conductor terminal and one pair of main-conductor terminals being secured and movable transversely of such main conductors at each such point.

Other modes of applying the principle of my invention may be employed instead of the one explained, change being made as regards the means herein disclosed, provided the means covered by any one of the following claims be employed.

I therefore particularly point out and distinctly claim as my invention—

1. The combination with two cable end portions, such portions crossing each other and each bent to form a loop intermediate of its extremity and the main portion of the cable, of a casing inclosing such end portions and formed with an outwardly-flaring portion adjacent to the point of entrance of the said end portions into the casing.

2. The combination with two cable end portions, such portions crossing each other and bent to form a loop intermediate of its extremity and the main portion of the cable, of a casing having a lower outwardly-flaring curved flange, said end portions entering said casing beneath such flange.

3. A cable-inclosing casing provided with a contracted neck, the body portion joining such neck in a curve, the end opposite such neck provided with an opening surrounded by an outwardly-projecting curved flange.

Signed by me this 22d day of May, 1900.

ROBERT S. DONALDSON.

Attest:
D. T. DAVIES,
A. E. MERKEL.